United States Patent [19]

Patil

[11] 3,974,823
[45] Aug. 17, 1976

[54] SOLAR COLLECTOR HAVING MINIMUM EDGE HEAT LOSS

[75] Inventor: Pandit G. Patil, Pittsburgh, Pa.

[73] Assignee: PPG Industries, Inc., Pittsburgh, Pa.

[22] Filed: Feb. 18, 1975

[21] Appl. No.: 550,681

[52] U.S. Cl. .................................. 126/271; 52/172
[51] Int. Cl.² ............................................. F24J 3/02
[58] Field of Search ............ 126/270, 271; 237/1 A; 34/80; 52/172

[56] References Cited
UNITED STATES PATENTS

| | | |
|---|---|---|
| 1,250,260 | 12/1917 | Wilcox ............................... 126/271 |
| 2,311,579 | 2/1943 | Scott .................................. 126/271 |
| 3,453,666 | 7/1969 | Hedges .............................. 126/271 |
| 3,771,276 | 11/1973 | Stewart et al. ....................... 52/172 |

FOREIGN PATENTS OR APPLICATIONS
938,012    9/1963    United Kingdom................. 126/271

*Primary Examiner*—Kenneth W. Sprague
*Assistant Examiner*—James C. Yeung
*Attorney, Agent, or Firm*—Donald Carl Lepiane

[57] ABSTRACT

A solar collector includes (1) an outer glass plate and an intermediate glass plate maintained in spaced relation by a first spacer assembly and (2) a solar energy absorber maintained in spaced relation to the intermediate cover plate by a second spacer assembly and a layer of thermal-insulating material, e.g., cork. The layer of cork is provided between the second spacer assembly and the marginal edge portions of the absorber to minimize conduction heat losses from the absorber to the spacer assembly.

10 Claims, 2 Drawing Figures

U.S. Patent  Aug. 17, 1976  3,974,823
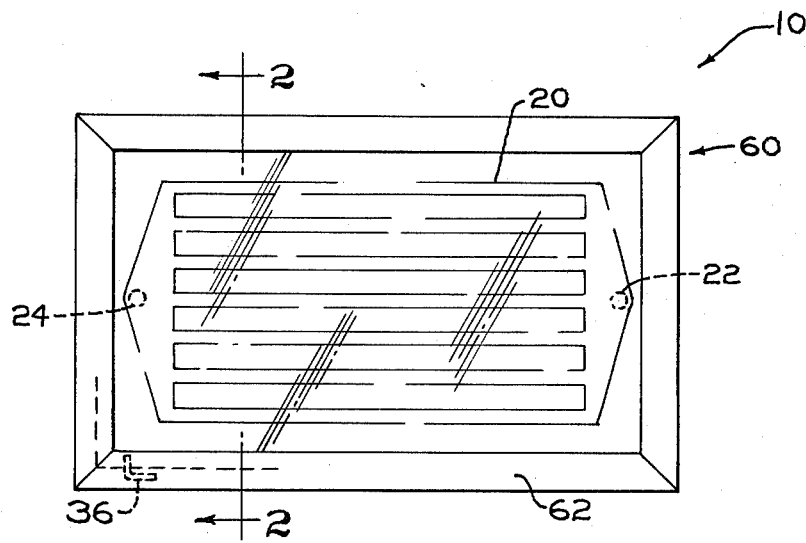
Fig.1
Fig.2
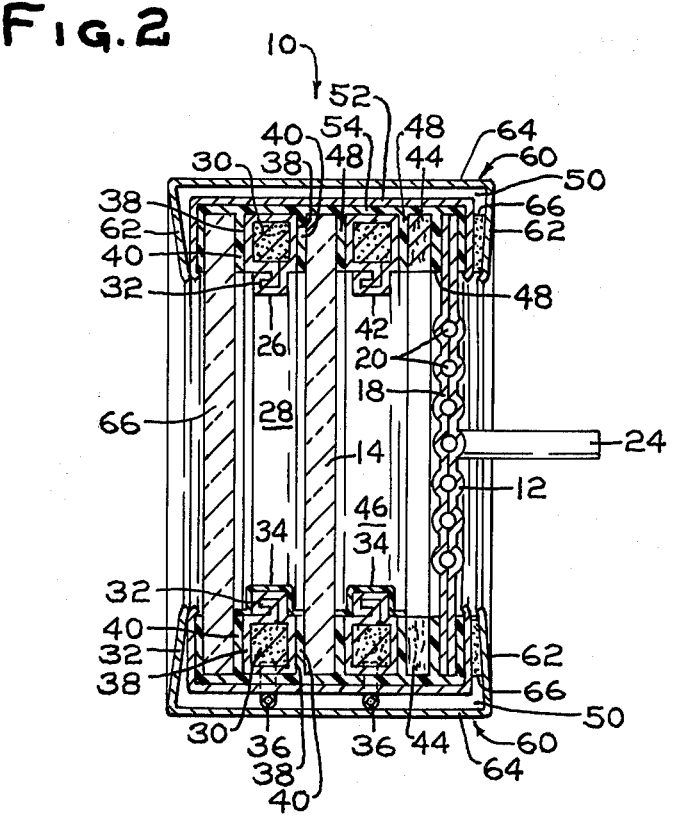

SOLAR COLLECTOR HAVING MINIMUM EDGE HEAT LOSS

RELATED APPLICATIONS

The spacer frame having a breather tube taught in commonly assigned U.S. patent application Ser. No. 550,680 filed even date in the names of Renato J. Mazzoni and Lester F. Schutrum and entitled "Solar Heat Collector Having a Breather Tube"; and the method of removing volatiles from moisture-impervious adhesive taught in commonly assigned U.S. patent application Ser. No. 550,679 filed even date in the names of George H. Bowser, Renato J. Mazzoni and Lester F. Schutrum and entitled "Method of Fabricating a Solar Heat Collector" may be used in the practice of the invention. The teachings of the above-identified applications are hereby incorporated by reference.

BACKGROUND OF THE INVENTION

1. Field of the Invention

This invention relates to a solar heat collector having minimum edge heat loss.

2. Discussion of the Technical Problems

The advantages of using solar heat collectors to collect solar energy for heating a fluid and/or for generating electric power have been recognized in the prior art.

In commonly assigned U.S. patent application Ser. No. 450,703 filed on Mar. 13, 1974, in the name of Pandit G. Patil and entitled "Solar Heat Collector Window", there is disclosed various embodiments of solar heat collectors that may be used to heat water.

In general, the solar heat collectors of the above-identified application include an outer glass plate, an intermediate glass plate and a solar energy absorber. A spacer assembly is provided between each of the cover plates and absorber. In general, each of the spacer assemblies include (1) a tubular metal spacer frame for maintaining the cover plates and absorber in spaced relation with airspaces therebetween; (2) a desiccant material in the spacer frames for absorbing moisture from the airspaces; and (3) a moisture-impervious adhesive between the spacer frames and adjacent cover plates and absorber to prevent moisture from moving into the airspaces.

Although the solar heat collectors disclosed in the above-identified application are ideally suitable for collecting solar radiation for subsequent use, there are limitations. For example, as the absorber is heated by solar radiation, the metal spacer frame adjacent the absorber is heated by conduction. This is because the moisture-impervious adhesive provided between the metal spacer frame and absorber is not a good thermal insulator. When the spacer frame is heated, heat is transmitted to the ambient air by convection which reduces the amount of heat that is available for use.

The loss of heat from the absorber to the metal space frame by conduction and the subsequent transfer of heat from the spacer frame to the ambient air by convection and/or radiation is termed edge heat loss.

It would be advantageous, therefore, if a solar heat collector was available that did not have the limitations of the prior art, more particularly, a solar heat collector that has minimum edge heat loss.

SUMMARY OF THE INVENTION

This invention relates to an improved solar heat collector of the type having at least one cover plate for passing solar radiation and a solar energy absorber. The improvement includes spacer facilities including a tubular spacer frame made of a thermal-insulating material for maintaining the at least one cover plate and absorber in spaced relation to provide an airspace therebetween and for reducing conduction heat losses at the marginal edge portions of the absorber. Facilities provide communication between desiccant material in the spacer frame and the airspace. A moisture-impervious adhesive is mounted on the spacer facilities, at least one cover plate and absorber for preventing moisture from moving into the airspace.

This invention also relates to an improved solar heat collector of the type having at least one cover plate for passing solar radiation; a solar energy absorber; a metal spacer frame for maintaining the cover plate and the absorber in spaced relation to provide an airspace therebetween; and facilities for preventing the ingress of moisture into the airspace. The improvement includes a thermal-insulating material between the absorber and the spacer frame to reduce conduction heat losses at the marginal edge portions of the absorber.

BRIEF DESCRIPTION OF THE DRAWING

FIG. 1 is a frontal view of a solar heat collector incorporating features of the invention;

FIG. 2 is a view taken along lines 2—2 of FIG. 1.

DESCRIPTION OF THE INVENTION

This invention relates to a solar heat collector having minimum edge heat loss. Referring to FIG. 1, there is shown a solar heat collector 10 incorporating features of the invention. In general, and with reference to FIGS. 1 and 2, the solar heat collector 10 includes a solar energy and infrared absorber 12, an intermediate cover plate 14 and an outer cover plate 16.

With reference to FIG. 2, the absorber 12 may be any of the types used in the solar collector art. In general, the solar absorber 12 is made of a heat conductive material such as aluminum, steel or copper. Surface 18 of the absorber 12 facing the sun is normally treated to provide maximum efficiency in absorbing solar radiation for subsequent use, e.g., heating a heat absorbing medium moving through conduits 20 provided in the absorber 12. The heat absorbing medium, e.g., water or a mixture of water and ethylene glycol, is moved into inlet pipe 22 through the conduits 20 and out of the conduits by way of outlet pipe 24 (see also FIG. 1).

The intermediate and outer cover plates 14 and 16, respectively, are selected to pass solar radiation to the absorber while reducing heat loss due to convection and/or conduction. Normally, the cover plates are made of glass and may be thermally or chemically tempered. Further, if desired, one or both of the glass plates may be selectively coated as taught in commonly assigned U.S. patent application Ser. No. 450,702 filed on Mar. 13, 1974, in the name of Frank H. Gillery and entitled "Solar Heat Collector".

The intermediate and outer cover plates 14 and 16, respectively, are maintained in spaced relation by a spacer frame 26 to provide an airspace 28 therebetween. The spacer frame 26, although not limited thereto, is of the type disclosed in U.S. patent application Ser. No. 550,680 filed even date in the names of Renator J. Mazzoni and Lester F. Schutrum and entitled "Solar Heat Collector Having A Breather Tube".

In general, the spacer frame 26 includes sections of lock seam spacers preferably having desiccant material 30 therein such as silica gel or molecular sieve. Communication is provided between the airspace 28 and the desiccant material 30 by way of passageways 32 provided in a continuous section of the spacer frame to absorb moisture in the airspace 28. The passageways 32 of the remaining section of the spacer frame are sealed in any conventional manner as by a layer of paint 34. A capillary tube 36 is mounted on the outer peripheral surface of the spacer frame spaced from the open passageways 32. In this manner, air free of moisture can be moved into the airspace and out of the airspace to equalize the air pressure in the airspace to the ambient air pressure as is taught in the above-identified application.

Opposed surfaces 38 of the spacer frame 26 are preferably adhered to marginal edge portions of adjacent cover plates by a moisture-impervious adhesive 40 to provide a primary moisture-impervious seal. "Moisture-impervious adhesive" as the term is used herein is adhesive that prevents moisture from moving into the airspace while adhesively bonding the spacer frame to the cover plates. The moisture-impervious adhesive used may be any of the types known in the solar heat collector art. For example, the moisture-impervious adhesive taught in U.S. patent application Ser. No. 550,679 filed even date in the names of George H. Bowser, Renato J. Mazzoni and Lester F. Schutrum and entitled "Method of Fabricating a Solar Heat Collector" may be used.

Mounted between the intermediate cover plate 14 and the absorber 12 is (1) a spacer frame 42 similar in construction to the spacer frame 26 and (2) a layer 44 of thermal-insulating material to (1) provide an airspace 46 between the intermediate cover plate 14 and the absorber 12; (2) equalize the air pressure in the airspace 46 to the ambient air pressure; and (3) minimize or eliminate conduction heat losses from the absorber to the spacer frame 42.

The thermal-insulating material selected preferably has a heat transfer coefficient of about less than 0.5 BTU per square foot per hour per degree f. ($6.8 \times 10^{-4}$ calories per square centimeter per second per degree C.). Thermal-insulating material having a heat transfer coefficient of greater than about 0.5 BTU per square foot per hour per degree F. ($6.8 \times 10^{-4}$ calories per square centimeter per second per degree C.) may be used but are not as efficient in minimizing edge heat loss. Types of thermal-insulating materials that may be used but not limited thereto are cork, asbestos, plastic sold under the trademark BAKELITE and synthetic resin polymers sold under the trademark TEFLON.

The thickness of the layer of thermal-insulating material 44 should be sufficient to prevent heat transfer from the absorber to the spacer frame 42. Thicknesses of about ⅛ inch (0.32 centimeter) minimum have been found to be satisfactory. The width of the layer of thermal-insulating material is preferably at least equal to the width of the adjacent surface of the spacer frame 42. In this manner, the spacer frame is supported in spaced relation to the absorber without having a bending moment applied to the spacer frame which could cause a break in the primary moisture-impervious seal. When the width of the layer 44 is greater than the width of the adjacent surface of the spacer frame, the absorber area exposed to solar energy is reduced.

A moisture-impervious adhesive 48 is preferably provided between (1) the spacer frame 42 and intermediate cover plate 14; (2) the spacer frame 42 and the layer 44 of thermal-insulating material; and (3) the layer 44 of thermal-insulating material and the absorber 12. The moisture-impervious adhesive 48 is of the type similar to the moisture-impervious adhesive 40.

The use of the layer of thermal-insulating material 44 between the spacer frame 42 and the absorber 12 minimizes edge heat loss. More particularly, during the use of the solar heat collector, the absorber absorbs solar radiation to heat the heat absorbing medium by conduction as the medium moves through the conduits 20. Also, the marginal edge portions of the absorber adjacent the metal spacer frame 42 conducts heat to the spacer frame and thereafter the heat is lost to the environment by way of convection and/or radiation. Any heat loss of the absorber minimizes the amount of heat available to heat the heat absorbing medium. By providing the layer of thermal-insulating material 44 between the spacer frame and the absorber, heat normally lost by the absorber to the spacer frame is minimized if not eliminated.

Certain select thermal-insulating materials are not moisture-impervious, e.g., cork or asbestos. Therefore, to prevent moisture from entering the airspace 46, it is recommended that a secondary moisture-impervious seal be used.

Referring to FIG. 2, the preferred type of secondary moisture-impervious seal includes a composite strip 50 which includes a bendable-formable tape 52, e.g., an aluminum tape having a layer 54 of a moisture-impervious adhesive thereon. The strip 50 is preferably provided around (1) the peripheral edge portions of the spacer frames 26 and 42; the heat insulating layer 44; the cover plates 14 and 16; and the absorber 12 and (2) the marginal edge portions of the outer cover plate 16 and absorber 12.

It has been found that conduction heat loss from the absorber at its marginal edges to a metal tape 52 of the composite strip 50 are minimal. It is believed that the heat losses are minimal because the mass of the tape is very small and is not a good heat sink to conduct heat away from the absorber. Therefore the use of a layer of thermal-insulating material between the absorber and the tape of the composite strip is optional.

As can now be appreciated, different embodiments may be used to reduce edge heat losses which are within the scope of the invention. For example, instead of using a tubular metal spacer frame between the intermediate cover plate and absorber, a tubular spacer frame made of thermal-insulating material may be used. For example, the spacer frame may be made of plastic or wood, preferably having a desiccant material therein.

Although not limiting to the invention, but recommended to protect the edges of the cover plates and provide structural stability to the collector by urging the cover plates and absorber toward each other about the spacer frames and layer of thermal-insulating material, a channel member 60 of essentially U-shaped cross-section extends completely around the perimeter of the solar collector. The channel member 60 is made of metal, e.g., stainless steel and has legs 62 and a central portion 64 forming an angle slightly less than 90°.

The legs 62 are held apart to permit insertion of the collector and thereafter the legs are released and spring back to contact the marginal edges of the outer cover plate and absorber. The channel member generally includes several sections of channeling that are joined or abutted together at their ends.

When a channel member is employed, it is recommended that the leg 62 of the channel member be separated from the marginal edge portions of the absorber 12 by a layer 66 of thermal-insulating material similar to the layer 44 of the thermal-insulating material.

DETAILED DESCRIPTION OF THE INVENTION

The invention will now be described to construct a solar heat collector in accordance with the teachings of the invention.

With reference to FIG. 2, spacer frames 26 and 42 are constructed in accordance to the teachings of the above-mentioned U.S. patent application Ser. No. 550,680 filed even date. In general, each spacer frame is constructed by mitering the ends of four (4) sections of a lock seam spacer of the type disclosed in U.S. Pat. No. 2,684,266. A desiccant material 30, such as molecular sieve, is provided in the spacer sections and the sections joined together as by welding to provide a spacer frame having dimensions of 7 feet (2.1 meters) × 3 feet (0.9 meter) × ½ inch (1.25 centimeters). Two adjacent spacer sections have their passageways 32 coated with a paint 34 such as the type sold by PPG Industries, Inc., under the trademark DURACRON Super 600L/G.

A capillary tube 36 having an outside diameter of 0.070 inch (0.18 centimeter) and an inside diameter of 0.020 inch (0.05 centimeter) is provided adjacent joined ends of the spacer sections having their passageways 32 sealed.

A pair of commercial soda-lime-glass sheets 14 and 16 having dimensions of 7 feet (2.1 meters) × 3 feet (0.9 meter) × ⅛ inch (0.32 centimeter) thick are provided. The glass sheets are preferably tempered so as to reduce the probability of breakage during use, e.g., from stones or hail. The glass sheets are cleaned in any conventional manner to remove any foreign particles that may inhibit the passing of solar radiation through the sheets toward absorber 12.

A layer of moisture-impervious adhesive 40 and 48 of the type disclosed in the above-mentioned U.S. patent application Ser. No. 550,679 filed even date having a thickness of about 0.015 to 0.020 inch (0.03 to 0.05 centimeter) and a width of less than about 5/16 inch (0.8 centimeter) is extruded onto opposed outer surfaces of the spacer frames 26 and 42, respectively.

In accordance to the teachings of the above-identified U.S. patent application Ser. No. 550,679 the spacer frames 26 and 42, having the layers of adhesive thereon are heated to remove any volatiles in the moisture-impervious adhesive and to drive off any moisture in the desiccant material 30.

An absorber 12 is provided having a conduit 20. The conduit 20 is connected at one end to an inlet pipe 22 and the other end to an outlet pipe 24 for moving a heat absorbing medium, e.g., water or a mixture of water and ethylene glycol therethrough. The absorber dimensions are 7 feet (2.1 meters) × 3 feet (0.9 meter).

Surface 18 of the absorber facing the sun is coated with black paint such as the type sold by PPG Industries, Inc., under the trademark DURACRON Super 600L/G and fired at a temperature of 350°F. (177°C.) for 15 to 20 minutes to provide the absorber with a surface having an absorptivity coefficient for solar radiation in a wavelength of 0.3 to 2.1 microns and an emissivity coefficient for infrared energy in the wavelength of 2 to 20 microns of about 0.95.

The absorber 12 is positioned on a rigid surface with the surface 22 facing upward. A layer of volatile free, moisture-impervious adhesive of the type disclosed in U.S. patent application Ser. No. 550,679 having a thickness of about 0.015 to 0.020 inch (0.03 to 0.05 centimeter) and a width of less than about 5/16 inch (0.8 centimeter) is provided around the marginal edge portions of the absorber. A layer of cork ⅛ inch (0.32 centimeter) thick and 5/16 inch (0.8 centimeter) wide is positioned on the layer of adhesive with marginal edges aligned. The spacer frame 42 having the moisture-impervious adhesive on opposed outer surfaces is positioned on the cork and the intermediate glass sheet 14 is positioned on top of the spacer frame with the marginal edges aligned. Thereafter, in a like manner, the spacer frame 26 is positioned on the intermediate glass sheet 14 followed by the outer glass sheet 16.

The adhesive between the spacer frame, glass sheets 14 and 16, the cork and the absorber 16 is flowed under a pressure of between about 2 to 10 pounds per square inch (0.14 – 0.7 kilograms per square centimeter) in any conventional manner to form a primary moisture-resistant seal.

Thereafter a composite strip 50 is provided. The strip includes a 1¾ inch (4.4 centimeters) wide aluminum tape 52 having a thickness of 0.010 inch (0.03 centimeter). A layer of moisture-resistant adhesive 54 is provided on one surface in any conventional manner. The adhesive 54 is similar to the adhesive 40 and 48. The strip is applied, in any conventional manner, to (1) the peripheral edges of the absorber, glass sheets, cork, spacer frame and (2) bent over the marginal edge portions of the outer glass sheet and the absorber to provide a secondary moisture-resistant seal with the tube 36 extended beyond the tape 52.

Preferably the strip extends completely around the perimeter of the collector with the ends overlapping. To assure a good secondary moisture-impervious seal, moisture-impervious adhesive is provided around the tube 36 where it extends through the tape 52 of the composite strip. Thereafter the tube is bent toward the tape 52 of the composite strip 50 and a covering is preferably provided over the tube 60 to prevent extremely large particles of dust from moving into the tube which could clog the tube. The covering may be a piece of aluminum or a felt pad inserted into the end of the tube.

A layer of cork 66 similar to the layer of cork 44 is adhesively bonded in any conventional manner to the portions of the composite strip on the marginal edge portions of the outer surface of the absorber 12 as shown in FIG. 2.

A channel member 52 of essentially U-shaped, cross-section is provided completely around the perimeter of the collector to protect the edges of the glass sheets and to provide structural stability to the collector by urging the glass sheets and absorber toward each other.

During use, the absorber 12 absorbs solar radiation to heat the heat absorbing medium moving through the conduits. Because the absorber is thermally insulated from the spacer frame 42 and the leg 62 of the channel member 52 by the layer 44 and 66, respectively of cork, there is no heat sink between the metal spacer frame and channeling, thereby reducing edge heat loss of the conductor 10.

What is claimed is:

1. In a solar heat collector of the type having at least one cover plate for passing solar radiation; a solar energy absorber plate; a metal spacer frame between the marginal edge portions of the cover plate and the absorber plate to maintain the cover plate and absorber plate in spaced relation to provide an airspace therebetween; and means for maintaining the cover plate and the absorber plate about the spacer frame, the improvement comprising:

a thermal-insulating material between the marginal edge portions of the absorber plate and the spacer frame to reduce conduction heat losses of the collector.

2. The improved solar heat collector as set forth in claim 1 wherein the thermal-insulating material is selected from the group consisting of cork, synthetic resin polymer, asbestos or plastic.

3. The improved solar heat collector as set forth in claim 1 wherein the thermal-insulating material has a heat transfer coefficient of less than about 0.5 BTU per square foot per hour per degree F. ($6.8 \times 10^{-4}$ calories per square centimeter per second per degree C.).

4. The improved solar heat collector as set forth in claim 1 further including:

a second cover plate for passing solar radiation;

a second spacer frame for maintaining the first and second cover plates in spaced relation to provide a second airspace therebetween; and means for maintaining the first and second cover plates in spaced relation about the second spacer frame.

5. The improved solar heat collector as set forth in claim 4 further including:

moisture impervious adhesive for sealing each of the airspaces against moisture penetration;

means for absorbing moisture from each of the airspaces; and means for equalizing the air pressure in each of the airspaces to the ambient air pressure while preventing the ingress of moisture into the airspaces.

6. The improved solar heat collector as set forth in claim 5 wherein said moisture impervious adhesive is a layer of moisture impervious adhesive between the marginal edge portions of the absorber plate and thermal insulating material; between the thermal insulating material and first spacer frame; between the first spacer frame and first cover plate; between the first cover plate and second spacer frame; and between the second spacer frame and second cover plate and further includes:

a composite strip comprising a bendable-formable tape having a moisture-impervious adhesive on one surface positioned on at least the peripheral edges of the second cover plate and absorber plate.

7. The improved solar heat collector as set forth in claim 6 wherein a strip of thermal insulating material is provided on the outer marginal edge portions of the absorber plate and the maintaining means includes:

a U-shaped channel around the periphery of the collector having its outer legs about the outer marginal edge portions of the second cover plate and said strip of thermal insulating material on the outer marginal edge of the absorber plate.

8. The improved solar heat collector as set forth in claim 7 wherein the thermal insulating material is selected from the group consisting of cork, synthetic resin polymer, asbestos or plastic.

9. The improved solar heat collector as set forth in claim 8 wherein the thermal insulating material is a strip of thermal insulating material having a heat transfer coefficient of less than about 0.5 BTU per square foot per hour per degree F. ($6.8 \times 10^{-4}$ calories per square centimeter per second per degree C.) and the width of said strip between the absorber plate and first spacer frame is approximately equal to the width of the adjacent surface of the first spacer frame.

10. The improved solar heat collector as set forth in claim 9 wherein the cover plates are made of tempered glass and the absorber plate is provided with conduit means for moving a heat absorbing medium therethrough.

* * * * *